United States Patent [19]

Yeh

[11] Patent Number: 5,434,007
[45] Date of Patent: * Jul. 18, 1995

[54] SILANE COATED FLAVOR/AROMA BARRIER FILM

[75] Inventor: Ming-Hsiung Yeh, Midland, Mich.

[73] Assignee: Dow Corning Corporation, Midland, Mich.

[*] Notice: The portion of the term of this patent subsequent to Dec. 6, 2011 has been disclaimed.

[21] Appl. No.: 124,090

[22] Filed: Sep. 20, 1993

[51] Int. Cl.⁶ .............................................. B32B 27/32
[52] U.S. Cl. .............................. 428/446; 427/372.2; 427/387; 427/393.5; 428/447; 428/451
[58] Field of Search ..................... 428/446, 447, 451; 427/372.2, 387, 393.5

[56] References Cited

U.S. PATENT DOCUMENTS

| | | | |
|---|---|---|---|
| 4,254,169 | 3/1981 | Schroeder | 482/35 |
| 4,421,823 | 12/1983 | Theisen et al. | 428/349 |
| 4,464,443 | 8/1984 | Farrell et al. | 428/688 |
| 4,495,249 | 1/1985 | Ohya et al. | 428/516 |
| 4,501,797 | 2/1985 | Super et al. | 428/349 |
| 4,547,433 | 10/1985 | Ohya et al. | 428/516 |
| 4,557,780 | 12/1985 | Newsome et al. | 156/244 |
| 4,561,920 | 12/1985 | Foster | 156/244 |
| 4,572,854 | 2/1986 | Dallmann et al. | 428/35 |
| 4,643,926 | 2/1987 | Mueller | 428/35 |
| 4,755,402 | 2/1988 | Oberle | 428/35 |
| 4,803,126 | 2/1989 | Wyman | 428/447 |
| 4,833,024 | 5/1989 | Mueller | 428/349 |
| 4,853,265 | 8/1989 | Warren | 428/34.9 |
| 4,855,183 | 8/1989 | Oberle | 428/345 |
| 4,886,690 | 12/1989 | Davis et al. | 428/36.6 |
| 4,891,253 | 1/1990 | Mueller | 428/35.2 |
| 4,898,786 | 2/1990 | Swofford | 428/480 |
| 4,904,525 | 2/1990 | Taniguchi et al. | 428/328 |
| 5,004,647 | 4/1991 | Shah | 428/349 |
| 5,009,924 | 4/1991 | Wyman | 427/44 |
| 5,077,135 | 12/1991 | Wyman | 428/447 |
| 5,096,738 | 3/1992 | Wyman | 427/44 |
| 5,215,822 | 6/1993 | Wyman et al. | 428/447 |
| 5,260,350 | 11/1993 | Wright | 522/42 |

FOREIGN PATENT DOCUMENTS 9200353-2 10/1993 Sweden .
2139948 5/1983 United Kingdom .

Primary Examiner—D. S. Nakarani
Attorney, Agent, or Firm—Richard I. Gearhart

[57] ABSTRACT

The present invention relates to the composition and preparation of composite films which exhibit low oxygen and flavor/aroma transmission rates. The film comprises a silane resin coated on a plastic substrate. The silane resin is formed from the mixture of a silane solution, an acrylate, a solvent, and optionally, either an additive, water or both. This invention teaches that a variety of silane solutions and acrylates may be mixed with different solvents to achieve the desired oxygen and flavor/aroma barrier characteristics.

8 Claims, No Drawings

SILANE COATED FLAVOR/AROMA BARRIER FILM

FIELD OF THE INVENTION

This invention relates to composite films generally, and composite films for applications requiring low flavor/aroma transmission rates in particular.

BACKGROUND OF THE INVENTION

The packaging industry has long searched for a packaging film which can serve as a barrier to flavors and aromas. Flavor and aroma barrier films generally serve two different purposes. First, the films prevent odors from the environment from contaminating the packaged material. This is particularly important where packaged food products are brought into an odor filled environment, because without such barrier protection the food may absorb the unpleasant odors. Second, the barrier films prevent contamination of the environment from the packaged material. In other words, materials with unpleasant odors will not pollute the environment surrounding the package. Thus foods witch strong or unpleasant odors may be stocked in a grocery store without regard to producing an unpleasant shopping atmosphere. Preventing flavor or aroma contamination of packaged goods is particularly important in the food and pharmaceutical industries. The present invention provides an extremely efficient, cost effective flavor-/aroma barrier film which can be used in a variety of packaging end uses.

SUMMARY OF INVENTION

The present invention relates to the composition and preparation of composite films which exhibit low oxygen and flavor/aroma transmission rates. The film comprises a silane resin coated on a plastic substrate. The silane resin is formed from the mixture of a silane solution, an acrylate, a solvent, and optionally, either an additive, water or both. This invention teaches that a variety of silane solutions and acrylates may be mixed with different solvents to achieve the desired oxygen and flavor/aroma barrier characteristics.

U.S. Pat. Nos. 5,077,135 and 5,096,738 to Wyman disclose a method of imbuing polymer films with gas impermeable surface characteristics using a silane compound and cross-linking same, while providing physical adsorption adherence to the film and with sufficient coating to produce gas and related barrier characteristics. However, the present invention is distinguishable from the '135 and '738 patents because the present invention teaches a mixture of a silane and an acrylate as primary components of the silane resin, rather than the strictly silane monomers or mixtures of silane monomers disclosed in the '135 and '738 patents. Moreover, the silane of the present invention cures in air, and does not require electron beam irradiation for curing as taught in the '135 and '738 patents.

DESCRIPTION OF THE PREFERRED EMBODIMENTS

While the invention is susceptible of embodiment in many different forms there is described herein in detail preferred and alternate embodiments of the invention. It should be understood, however, that the present disclosure is to be considered an exemplification of the principles of the invention and is not intended to limit the spirit and scope of the invention and/or claims of the embodiments illustrated.

The preferred embodiment of the invention is a film consisting of a plastic substrate having disposed thereon a coating of silicone resin formed from a silane solution. The plastic material may, but need not be, a commercially available polyolefin, such as polyethylene, polypropylene, or polyethyleneterephthalate or a polyester, such as MYLAR available from DuPont, (Wilmington, Del.). The substrate may be any thickness, but will likely be at least 25 microns thick.

In the following embodiments and examples of the invention, the silicone resin is formed from a mixture of the following reactants:

(a) a silane having the formula

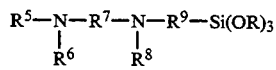

where

R is a hydrocarbon radical having from one to four carbon atoms inclusive, $R^5$, $R^6$, $R^8$ are selected from the group consisting of hydrogen, methyl and ethyl radicals, and at least one of $R^5$, $R^6$, or $R^8$ is a hydrogen radical, $R^7$ is a hydrocarbon radical having from two to four carbon atoms inclusive, $R^9$ is a hydrocarbon radical having from three to six carbon atoms inclusive, (b) an acrylate selected from the group consisting of

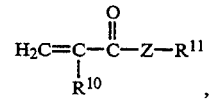

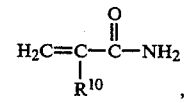

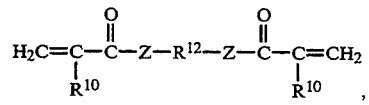

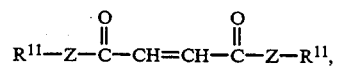

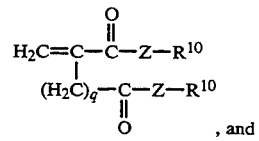

, and

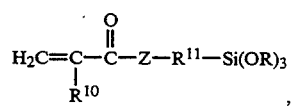

where

R is as defined above, $R^{10}$ is a hydrogen or methyl group, $R^{11}$ is an alkyl or alkenyl group, $R^{12}$ is an alkyl group, an alkenyl group, or a —[$(CH_2)_n$—O]$_x$—$(H_2C)_n$ group, where n is from 2 to 4, and x is from 1 to 6, q is 1 or 0, and Z is an oxygen, NH, NR, or $NR^{11}$, where R is a hydrocarbon radical having from one to four carbon atoms inclusive, and $R^{11}$ is an alkyl or alkenyl group; and (c) a solvent, such as methanol, ethanol, isopropanol or a mixture thereof;

and optionally, (d) an additive selected from the group consisting of $Si(OR)_4$ or a partial hydrolyzate thereof, or $R^{11}$—$Si(OR)_3$, where $R^{11}$ is an alkyl or alkenyl group, and R is a hydrocarbon radical having from one to four carbon atoms inclusive.

The silane solution is prepared by initially mixing the silane component (a) with the acrylate component (b) to form a silane mixture. The ratio of silane component (a) to acrylate component (b) in the same silane mixture can range from 1:0 to 1:1. The silane mixture may constitute up to 100 percent of the silane solution, but it is preferred that the silane mixture constitute 10 percent of the silane solution by weight.

To this silane mixture is added an appropriate amount of solvent, which may be methanol, ethanol, isopropanol or mixtures thereof. The amount of solvent added to the silane mixture can range from 1 percent to 99 percent of the total silane solution by weight, but is preferred to be about 80 percent by weight of the silane solution. After adding the solvent, water may be added (up to 80 percent by weight of the silane solution, though 8 percent is preferred). Optionally, additive (d) may be added, which may comprise Up to 50 percent by weight of the silane mixture. By partial hydrolyzate of $Si(OR)_4$ it is meant that portion of $Si(OR)_4$ which hydrolyizes in solution at room temperature. It appears that adding incremental amounts of the additive improves flavor/aroma barrier properties but increases the oxygen transmission rates. Once the silane solution is prepared, it is simply coated onto the plastic substrate and air or oven dried.

To prepare the preferred embodiment, a silane solution is prepared, consisting of a mixture of 10 grams of $H_2N$—$CH_2CH_2$—NH—$CH_2$—$CH_2$—$CH_2$—$Si(OCH_3)_3$ plus 2 grams of methyl acrylate ($H_2C$=CH—(C=O)—O—$CH_3$). To 10 grams of the resulting mixture is added 90 grams of isopropyl alcohol and 8 grams of water. This solution is coated on both sides of a corona treated substrate of low density polyethylene of approximately 100 micron thickness. After coating, the silane solution is allowed to cure to form a silicone resin at room temperature to give a 3-layer film.

While the examples below set forth the oxygen transmission rates of the three film, the silane coating disclosed herein can also be used in the multi-layer sandwich configuration disclosed in United States Patent Application entitled "Barrier Film For Packaging", Ser. No. 08/062,378, now U.S. Pat. No. 5,372,880, and United States Patent Application entitled "Film For Packaging Having Oxygen Barrier Characteristics", Ser. No. 08/124,120, now U.S. Pat. No. 5,370,937, each the above applications being incorporated herein by reference.

EXAMPLES

The following flavor barrier transmission rates were measured using the Fisher Permeability Cup, available from Fisher Scientific, Pittsburgh, Pa. The Fisher Cup was filled with one of d-limonene, toluene, methyl salicylate, pinene, ally sulfide or ethyl acetate. The cup was then covered with the test film and clamped to the cup. The filled cup was weighed and left to stand at ambient temperature for 24 to 48 hours, then weighed again.

The measurements of oxygen permeability for each of the composite films discussed in the following examples were made using pure oxygen on a MOCON OX-TRAN 100A tester according to the ASTM F1307-90 at 32.5° C. "Dry" readings were taken in an environment where the relative humidity was 0 percent and the "wet" readings were taken in an environment where the relative humidity was greater than 85 percent. Corona treatment of the substrates was done by passing the substrate under a Tesla Coil for approximately one-half second. All the films produced below are transparent, flexible and creasable, and will not crack when bent.

Example I

To prepare a each of the following composite films, low density polyethylene (LDPE) substrates of 100 micron thickness were corona treated. Each LDPE substrate was coated on both sides with one of the silane solutions described below. Coating thickness of the silane layer of each film was estimated to be between 1 and 2 microns. After coating, each film was allowed to cure at room temperature to form a silicone resin.

Silane Solution No. 1 consisted of a mixture of 10 grams of $H_2N$—$CH_2CH_2$—NH—$CH_2$—$CH_2$—$CH_2$—$Si(OCH_3)_3$ plus 90 grams of isopropyl alcohol and 8 grams of water.

Silane Solution No. 2 consisted of a mixture of 10 grams of $H_2N$—$CH_2CH_2$—NH—$CH_2$—$CH_2$—$CH_2$—$Si(OCH_3)_3$ plus 2 grams of methyl acrylate ($H_2C$=CH—(C=O)—O—$CH_3$). To 10 grams of the resulting mixture was added 90 grams of isopropyl alcohol and 8 grams of water.

Silane Solution No. 3 consisted of a mixture of 10 grams of $H_2N$—$CH_2CH_2$—NH—$CH_2$—$CH_2$—$CH_2$—$Si(OCH_3)_3$ plus 3.8 grams of dimethyl maleate ($H_3C$—O—(C=O)—CH=CH—C(C=O)—O—$CH_3$). To 10 grams of the resulting mixture was added 90 grams of isopropyl alcohol and 8 grams of water.

Silane Solution No. 4 consisted of a mixture of 10 grams of $H_2N$—$CH_2CH_2$—NH—$CH_2$—$CH_2$—$CH_2$—$Si(OCH_3)_3$ plus 2 grams of triethylene glycol dimethylacrylate ($H_2C$=C($CH_3$)—C(=O)—O—($CH_2CH_2O)_3$—C(C=O)—C($CH_3$)=$CH_2$). To 10 grams of the resulting mixture was added 90 grams of isopropyl alcohol and 8 grams of water.

Silane Solution No. 5 consisted of a mixture of 10 grams of $H_2N$—$CH_2CH_2$—NH—$CH_2$—$CH_2$—$CH_2$—$Si(OCH_3)_3$ plus 2 grams of 3-methacryloxyprpyltrimethoxysilane ($H_2C$=C($CH_3$)—C(=O)—O—$CH_2CH_2CH_2$—$Si(OCH_3)_3$). To 10 grams of the resulting mixture was added 90 grams of isopropyl alcohol and 8 grams of water.

Silane Solution No. 6 consisted of a mixture of 10 grams of $H_2N$—$CH_2CH_2$—NH—$CH_2$—$CH_2$—$CH_2$—$Si(OCH_3)_3$ plus 4 grams of dimethyl itaconate ($H_3C$—O—C(=O)—$CH_2$—C(=$CH_2$)—C(=O)—O—($CH_3$)). To 10 grams of the resulting mixture was added 90 grams of isopropyl alcohol and 8 grams of water.

Silane Solution No. 7 consisted of a mixture of 10 grams of $H_2N$—$CH_2CH_2$—NH—$CH_2$—$CH_2$—$CH_2$—$Si(OCH_3)_3$, 90 grams of isopropyl alcohol, 8 grams of water and 2 grams of polydiethoxysiloxane.

Silane Solution No. 8 consisted of a mixture of 10 grams of $H_2N$—$CH_2CH_2$—NH—$CH_2$—$CH_2$—$CH_2$ 2—Si (OCH$_3$)$_3$ plus 2 grams of methyl acrylate (H$_2$C=CH—(C=O)—O—CH$_3$). To 10 grams of the resulting mixture was added 90 grams of isopropyl alcohol, 8 grams of water, and 2 grams of the additive polydiethoxysiloxane.

Silane Solution No. 9 consisted of a mixture of 10 grams of H$_2$N—CH$_2$CH$_2$—NH—CH$_2$—CH$_2$—CH$_2$—Si(OCH$_3$)$_3$ plus 3 grams of methyl acrylate (H$_2$C=CH—(C=O)—O—CH$_3$). To 10 grams of the resulting mixture was added 90 grams of isopropyl alcohol, 8 grams of water, and 2 grams of the additive polydiethoxysiloxane.

Silane Solution No. 10 consisted of a mixture of 10 grams of H$_2$N—CH$_2$CH$_2$—NH—CH$_2$—CH$_2$—CH$_2$—Si(OCH$_3$)$_3$ plus 2 grams of methyl acrylate (H$_2$C=CH—(C=O)—O—CH$_3$). To 10 grams of the resulting mixture was added 90 grams of isopropyl alcohol, 8 grams of water, and 2 grams of the additive CH$_3$—Si(OCH$_3$)$_3$.

Silane Solution No. 11 consisted of a mixture of 10 grams of H$_2$N—CH$_2$CH$_2$—NH—CH$_2$—CH$_2$—CH$_2$—Si(OCH$_3$)$_3$ plus 2 grams of triethylene glycol dimethylacrylate (H$_2$C=C(CH$_3$)—C(=O)—O—(CH$_2$CH$_2$O)$_3$—C(=O)—C(CH$_3$)=CH$_2$). To 10 grams of the resulting mixture was added 90 grams of isopropyl alcohol, 8 grams of water, and 1 gram of the additive polydiethoxysiloxane.

Silane Solution No. 12 consisted of a mixture of 10 grams of H$_2$N—CH$_2$CH$_2$—NH—CH$_2$—CH$_2$—CH$_2$—Si(OCH$_3$)$_3$ plus 2 grams of acrylamide (H$_2$C=CH—C(=O)—NH$_2$). To 10 grams of the resulting mixture was added 90 grams of isopropyl alcohol, 8 grams of water.

Silane Solution No. 13 consisted of 25 grams HCl.CH$_2$=CHC$_6$H$_4$CH$_2$NHCH$_2$CH$_2$NHCH$_2$CH$_2$CH$_2$—Si(OMe)$_3$ solution (40% by weight in methanol), 75 grams methanol and 4 grams water, and was aged for 16 hours prior to coating. The excess solvent was removed by drying the treated film for 2 hours at 25° C. The cure of the silane solution took place by electron beam irradiation, which consisted of exposure of the film to 4 megarads of radiation.

The results of the of the oxygen permeability tests and the flavor barrier tests of films made from the above silane solutions are reported below in Table 1. Flavor barrier tests measured the transmission rate of d-Limonene and toluene using the previously described method.

TABLE 1

Oxygen, d-limonene, and toluene transmission rates of silane coated 100 micron LDPE films.

| Formulation | O2 Dry | O2 Wet | Limon | Tolue |
| --- | --- | --- | --- | --- |
|  | (c · c/m2/day) |  | (g/m2/day) |  |
| Uncoated LDPE | 2400 | 2400 | 113 | 785 |
| Silane Solution No. 1 | 80 | 1100 | 6.1 | 8.8 |
| Silane Solution No. 2 | 50 | 290 | 0.8 | 5.9 |
| Silane Solution No. 3 | — | — | 1.8 | 9.8 |
| Silane Solution No. 4 | 800 | — | <0.1 | 21.8 |
| Silane Solution No. 5 | — | — | <0.1 | 5.2 |
| Silane Solution No. 6 | 15 | 440 | 0.6 | 4.4 |
| Silane Solution No. 7 | 90 | — | <0.1 | 7.8 |
| Silane Solution No. 8 | 210 | 410 | <0.1 | 4.8 |
| Silane Solution No. 9 | — | — | <0.1 | 7.3 |
| Silane Solution No. 10 | 760 | — | <0.1 | 7.2 |
| Silane Solution No. 11 | 650 | — | — | — |
| Silane Solution No. 12 | .75 | 900 | 0.5 | 5.0 |
| Silane Solution No. 13 | 30–100 | >2000 | 66 | 794 |

Table 1 shows that coating the LDPE with a silane solution drastically improves both the oxygen and flavor/aroma barrier properties over the uncoated LDPE. Moreover, the combinations of silane plus acrylate (Silane Solutions No. 1–12) showed significant improvement in oxygen and flavor/aroma barrier characteristics over the silane solution (No. 13) which did not include an acrylate component and was cured with electron beam irradiation.

Example II

Samples of the films made from Silane Solutions No. 2, No. 8, and No. 13, as described above, and uncoated low density polyethylene film (LDPE) film were tested on flavor/aroma components other than d-limonene and toluene, namely, methyl salicylate, pinene, allyl sulfide, and ethyl acetate. The results are summarized in Table 2.

TABLE 2

Permeability of Other Flavors/Aromas

| Flavor/Aroma Component | Transmission Rate (gm/sq. m/day) | | | |
| --- | --- | --- | --- | --- |
|  | No. 2 | No. 8 | No. 13 | Uncoated LDPE |
| Methyl Salicylate | <0.1 | <0.1 | <0.1 | 10.7 |
| Pinene | 0.5 | 0.1 | 0.4 | 75.1 |
| Allyl Sulfide | 0.7 | 0.5 | 2.9 | 157 |
| Ethyl Acetate | 17.0 | 14.0 | 14.8 | 120 |

As is apparent from the data in Table 2, the silane coated films show a dramatic decrease in flavor/aroma transmission rates over a wide variety of flavor/aroma components when compared to uncoated LDPE. Silane Solutions No. 2 and 8 showed excellent flavor/aroma transmission rates even though the silane solution cured in air, rather than by electron beam irradiation.

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

What is claimed:

1. A composite film having oxygen, odor and flavor barrier properties, comprising:

a layer of silicone resin disposed on a plastic substrate, wherein the silicone reisn is derived from a silane solution comprising (a) a silane having the formula

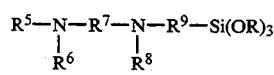

where

R is a hydrocarbon radical having from one to four carbon atoms inclusive, $R^5$, $R^6$, $R^8$ are selected from the group consisting of hydrogen, methyl and ethyl radicals, and at least one of $R^5$, $R^6$, or $R^8$ is a hydrogen radical, $R^7$ is a hydrocarbon radical having from two to four carbon atoms inclusive, $R^9$ is a hydrocarbon radical having from three to six carbon atoms inclusive, (b) a monoacrylate individually selected from the group consisting of

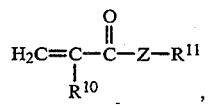

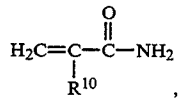

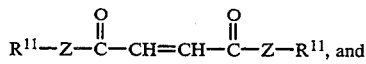

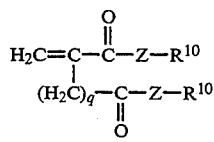

where
R is as defined above,
$R^{10}$ is a hydrogen or methyl group,
$R^{11}$ is an alkyl or alkenyl group,
q is 1 or 0, and
Z is oxygen, NH, NR, or $NR^{11}$, where R is a hydrocarbon radical having from one to four carbon atoms inclusive, and $R^{11}$ is an alkyl or alkenyl group; and (c) a solvent;
wherein the weight ratio of the silane to the acrylate is from 1:0.1 to 1:1.

2. The composite film of claim 1, wherein the plastic substrate is a polyolefin.

3. The composite film of claim 1, wherein said silane solution includes an additive from the group consisting of
$Si(OR)_4$ or a partial hydrolyzate thereof; and
$R^{11}$—$Si(OR)_3$, where $R^{11}$ is an alkyl or alkenyl group, and R is a hydrocarbon radical having from one to four carbon atoms inclusive.

4. The composite film of claim 1, wherein said solvent is an alcohol.

5. The composite film of claim 1, wherein said silane solution includes water.

6. The composite film of claim 1, made by the steps comprising
coating, in the presence of water, said plastic substrate with a silane solution; and
curing the silane solution at room temperature in air without electron beam or ultraviolet irradiation, or a peroxide, to form a silicone resin coated multilayer composite film.

7. The composite film of claim 6, made by the additional step of exposing said plastic substrate to corona treatment prior to coating with said silane solution.

8. The composite film of claim 6, made by the additional step of drying said composite film.

* * * * *